United States Patent
Arima et al.

(10) Patent No.: US 9,602,010 B2
(45) Date of Patent: Mar. 21, 2017

(54) INSULATED DC POWER SUPPLY AND A METHOD OF CONTROLLING SAME

(71) Applicants: Satoshi Arima, Inagi (JP); Kenji Nakata, Atsugi (JP); Takeshi Sato, Kawasaki (JP)

(72) Inventors: Satoshi Arima, Inagi (JP); Kenji Nakata, Atsugi (JP); Takeshi Sato, Kawasaki (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 0 days.

(21) Appl. No.: 14/964,448

(22) Filed: Dec. 9, 2015

(65) Prior Publication Data

US 2016/0172985 A1 Jun. 16, 2016

(30) Foreign Application Priority Data

Dec. 15, 2014 (JP) ................................. 2014-252823

(51) Int. Cl.
  *H02M 3/335* (2006.01)
  *H02M 1/00* (2006.01)

(52) U.S. Cl.
  CPC .............. *H02M 3/33507* (2013.01); *H02M 2001/0009* (2013.01)

(58) Field of Classification Search
  CPC ................ H02M 3/33507; H02M 2001/0009
  USPC ....................................................... 363/21.12
  See application file for complete search history.

(56) References Cited

U.S. PATENT DOCUMENTS

| 8,305,776 B2* | 11/2012 | Fang ................. H02M 3/33507 307/103 |
| 8,537,574 B2 | 9/2013 | Isogai et al. |
| 2008/0112193 A1* | 5/2008 | Yan ................... H02M 3/33515 363/21.08 |
| 2011/0149614 A1* | 6/2011 | Stracquadaini ... H02M 3/33507 363/21.12 |
| 2013/0033905 A1* | 2/2013 | Lin ................... H02M 3/33507 363/21.13 |
| 2015/0280584 A1* | 10/2015 | Gong ................ H02M 3/33515 363/21.13 |

FOREIGN PATENT DOCUMENTS

| JP | 2005341730 A | 12/2005 |
| JP | 2011176926 A | 9/2011 |

* cited by examiner

*Primary Examiner* — Jue Zhang
(74) *Attorney, Agent, or Firm* — Holtz, Holtz & Volek PC

(57) ABSTRACT

An insulated DC power supply includes a voltage transformer, a switching device and a primary-side regulating circuit. The voltage transformer includes primary and secondary windings and an auxiliary winding. The switching device causes current to flow intermittently through the primary winding. The primary-side regulating circuit receives a voltage proportional to a current flowing through the primary winding of the transformer, and a voltage proportional to a voltage induced in the auxiliary winding of the transformer to generate and output a drive pulse for turning on or off the switching device. The primary-side regulating circuit includes an ON/OFF signal generator circuit and first and second timer circuits. The switching device is turned off upon expiration of the first timer circuit, and the ON/OFF signal generator circuit does not generate a signal for turn-on of the switching device when the second timer circuit expires.

8 Claims, 6 Drawing Sheets

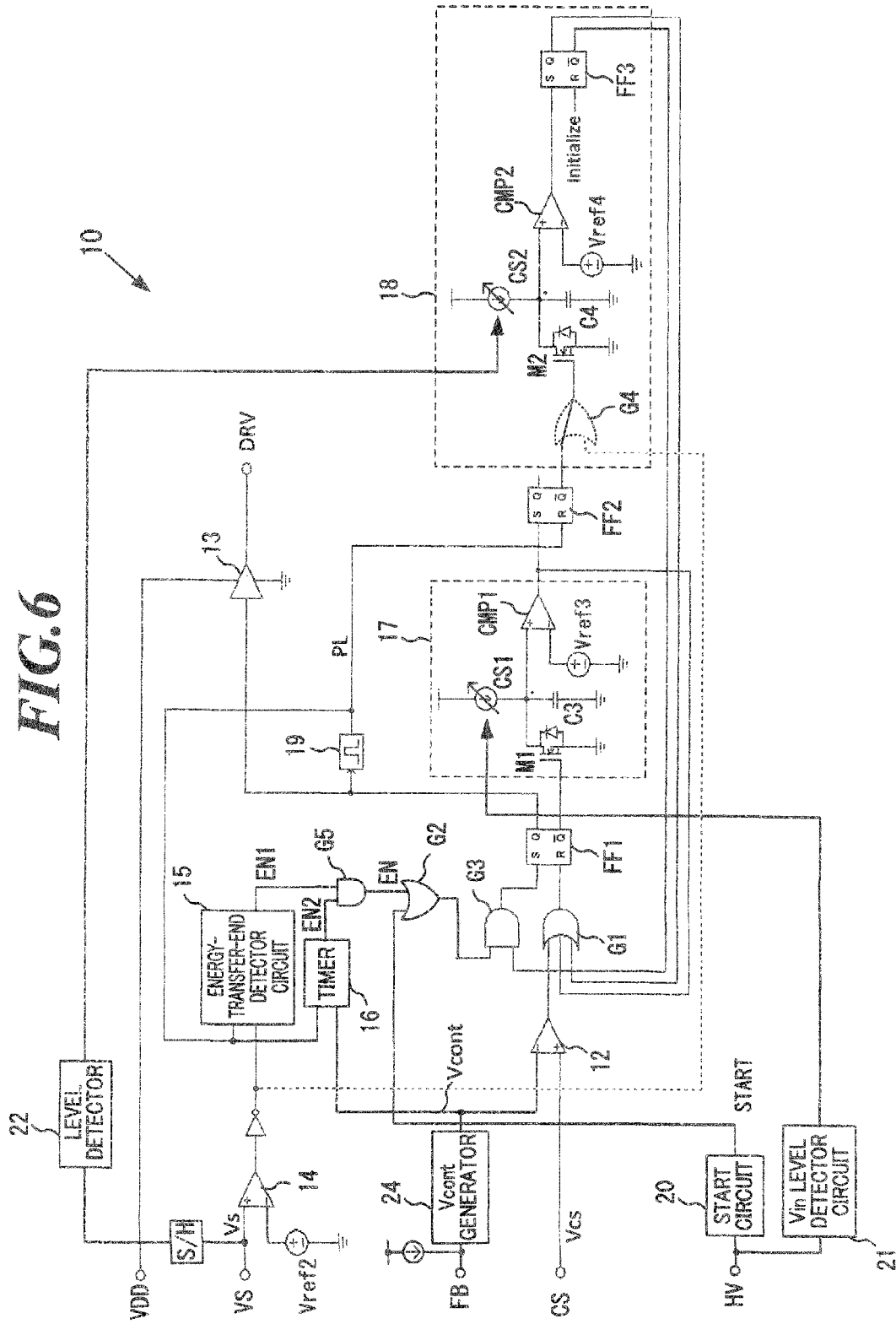

INSULATED DC POWER SUPPLY AND A METHOD OF CONTROLLING SAME

BACKGROUND OF THE INVENTION

1. Field of the Invention

The present invention relates to an insulated DC power supply including a voltage transformer and a method of controlling same, particularly to a technique applicable to a primary-side regulating circuit in an insulated DC-DC converter driven by current intermittently flowing through a primary winding by a switching operation.

2. Description of Related Art

A typical DC power supply is an insulated DC-DC converter controlled by a switching operation that involves turning on or off a switching device connected in series with a primary winding of a voltage transformer to control the current flowing through the primary winding and thus the voltage induced in the secondary winding.

In order to regulate a primary-side, some DC-DC converters controlled by switching operations involve detection of the output voltage or current of the secondary side and its feedback to the primary side and include a current-detecting resistor connected in series with a switching device on the primary side and a primary-side regulating circuit (IC) that has a terminal (current-detecting terminal) to receive voltage resulting from current-to-voltage conversion in the resistor (see JP 2011-176926 A).

Examples of such insulated DC-DC converters controlled by switching operations include flyback converters that control the state of current.

In such a converter, the output voltage or current of the secondary side is detected and fed back to the primary side to control the peak current of the switching device and thus the output voltage or current. The primary-side regulating circuit in this converter includes a resistor (sensing resistor) connected in series with the switching device to convert current into voltage. If this voltage exceeds a level dependent on a feedback signal, the switching device is turned off. Thus, the peak current is controlled.

SUMMARY OF THE INVENTION

A typical insulated DC-DC converter has a given rated load current (or maximum load current). Overcurrent, (which exceeds the rated load current) flowing through the secondary side may cause damage to the power supply. To prevent such a phenomenon, the primary-side regulating circuit may have an overcurrent-detecting function and an overcurrent protection function that halts the regulation upon detection of overcurrent (see JP 2005-341730 A).

Unfortunately, in an insulated DC-DC converter involving control of the output voltage by monitoring the voltage of the sensing resistor, the current flowing through the primary side increases but the potential of the current detecting terminal remains unchanged in case of short circuit between the both terminals of the current-detecting resistor or between the current detecting terminal and the ground. Consequently, the output voltage is no longer under control and overcurrent flows through the switching device, which may cause abnormal heat and damage to the components.

An object of the present invention, which has been made in such a background, is to provide a technique applicable to an insulated DC power supply that includes a voltage transformer and involves turning on or off the switching device to control the current flowing through the primary winding for controlling the output. The technique involves immediately interrupting the flow of current into the primary winding in case of short circuit of the current-detecting resistor in order to prevent damage to the switching device, transformer, diodes and other components.

To achieve the object described above, there is provided an insulated DC power supply including:

a voltage transformer including a primary winding, a secondary winding, and an auxiliary winding;

a switching device causing current to flow intermittently through the primary winding of the transformer; and a primary-side regulating circuit receiving a voltage proportional to a current flowing through the primary winding of the transformer, and a voltage proportional to a voltage induced in the auxiliary winding of the transformer to generate and output a drive pulse for turning on or off the switching device, the primary-side regulating circuit including:

a voltage detector circuit giving ON-timings for the switching device with reference to a voltage across the primary winding of the transformer, the voltage induced in the auxiliary winding, or the voltage proportional to the voltage induced in the auxiliary winding;

a current detector circuit giving OFF-timings for the switching device with reference to the voltage proportional to the current flowing through the primary winding of the transformer;

an ON/OFF signal generator circuit generating signals for turning on or off the switching device with reference to signals from the current detector circuit and the voltage detector circuit;

a first timer circuit starting up in synchronization with the ON timing of the switching device, starting to measure the ON time of the switching device, and then expiring upon lapse of a predetermined primary side maximum ON time; and a second timer circuit starting up upon expiration of the first timer circuit, starting time measurement, and then expiring upon lapse of a predetermined maximum demagnetization time, wherein the switching device is turned off upon expiration of the first timer circuit, and the ON/OFF signal generator circuit does not generate a signal for turn-on of the switching device when the second timer circuit expires.

Another aspect of the present invention is a method of controlling an insulated DC power supply including:

a voltage transformer including a primary winding, a secondary winding, and an auxiliary winding;

a switching device causing current to flow intermittently through the primary winding of the transformer; and a primary-side regulating circuit receiving a voltage proportional to a current flowing through the primary winding of the transformer, and a voltage proportional to a voltage induced in the auxiliary winding of the transformer to generate and output a drive pulse for turning on or off the switching device, the method including:

monitoring the voltage induced in the auxiliary winding of the transformer or the voltage proportional to the voltage induced in the auxiliary winding, and the voltage proportional to the current flowing through the primary winding of the transformer;

starting a first time-measurement in synchronization with each ON-timing of the switching device;

starting the next ON operation of the switching device when the current detector circuit detects that the current flowing through the primary winding of the transformer reaches a predetermined current value before expiration of a predetermined primary side maximum ON time;

turning off the switching device and starting a second time-measurement upon expiration of the primary side maximum ON time before the current detector circuit detects that the current flowing through the primary winding of the transformer reaches the predetermined current value; and preventing generation of an ON signal for the switching device after expiration of a predetermined maximum demagnetization time.

With a traditional method, short circuit of the current-detecting resistor interrupts supply of a voltage proportional to the current flowing through the primary winding, leading to a long on-time of the switching device, a high peak current of the primary winding, and thus a long demagnetizing time of the transformer. With the device or method of the invention, flow of current through the primary winding is immediately interrupted upon expiration of the second timer circuit starting up upon expiration of the first timer circuit. This prevents damage to the switching device, transformer, diodes and other components in case of short circuit between the both terminals of the current-detecting resistor or between the current-detecting terminal of the primary-side regulating circuit (IC) and the ground.

The current detector circuit can receive a voltage resulting from current-to-voltage conversion in the resistor connected in series with the switching device.

The voltage detector circuit can receive a voltage from the voltage divider that divides the voltage induced in the auxiliary winding of the transformer.

The present invention may further include a demagnetization period detector that detects the demagnetization period of the transformer so that the second timer circuit executes a timing operation only during the demagnetization period of the transformer detected by the demagnetization period detector.

The present invention preferably includes an input-voltage-level detector circuit that detects the input voltage of the primary winding of the transformer such that the first timer circuit measures the time inversely proportional to the input voltage.

This configuration produces a variable primary side maximum ON time which is inversely proportional to the input voltage and cancels the dependence of the peak currents of the primary side and secondary side of the transformer on the input voltage in case of short circuit of the sensing resistor, suppressing the increase of power loss and reducing the risk of damage to the device.

The present invention preferably includes an induced-voltage-level detector circuit that detects the potential of the voltage from the voltage divider, which divides the voltage induced in the auxiliary winding of the transformer, such that the second timer circuit measures the time inversely proportional to the induced voltage.

This configuration produces a variable maximum demagnetization time of the transformer inversely proportional to the voltage induced in the auxiliary winding and cancels the dependence of the peak current of the transformer on the output voltage during a halt of switching, thereby preventing damage to the loads due to the dependence of the peak current on the output voltage.

The current detector circuit preferably is a voltage comparator circuit that compares the voltage resulting from current-to-voltage conversion in the resistor connected in series with the switching device, with a voltage proportional to the voltage from the voltage divider and outputs an signal indicating an OFF-timing of the switching device.

This configuration can prevent damage to the switching device, transformer, and diodes and other components in case of short circuit of the current-detecting resistor in such a primary side regulation (PSR) insulated DC power supply (DC-DC converter) which regulates the output voltage of the secondary side with reference to data from the primary side and without a feedback voltage from the secondary side.

According to the present invention, in an insulated DC power supply that includes a voltage transformer and involves turning on or off the switching device to control the current flowing through the primary winding for controlling the output, flow of current into the primary winding is interrupted immediately after short circuit of the current-detecting resistor or short circuit between the current-detecting terminal of the primary-side regulating circuit (IC) and the ground, thereby preventing damage to the switching device, transformer, diodes and other components.

BRIEF DESCRIPTION OF THE DRAWINGS

FIG. 6 is a circuit diagram illustrating an exemplary configuration of the internal circuitry of the primary-side regulating IC in the DC-DC converter of FIG. 5.

DESCRIPTION OF THE PREFERRED EMBODIMENT

A preferred embodiment of the present invention will now be described with reference to the attached drawings.

Figure 1:
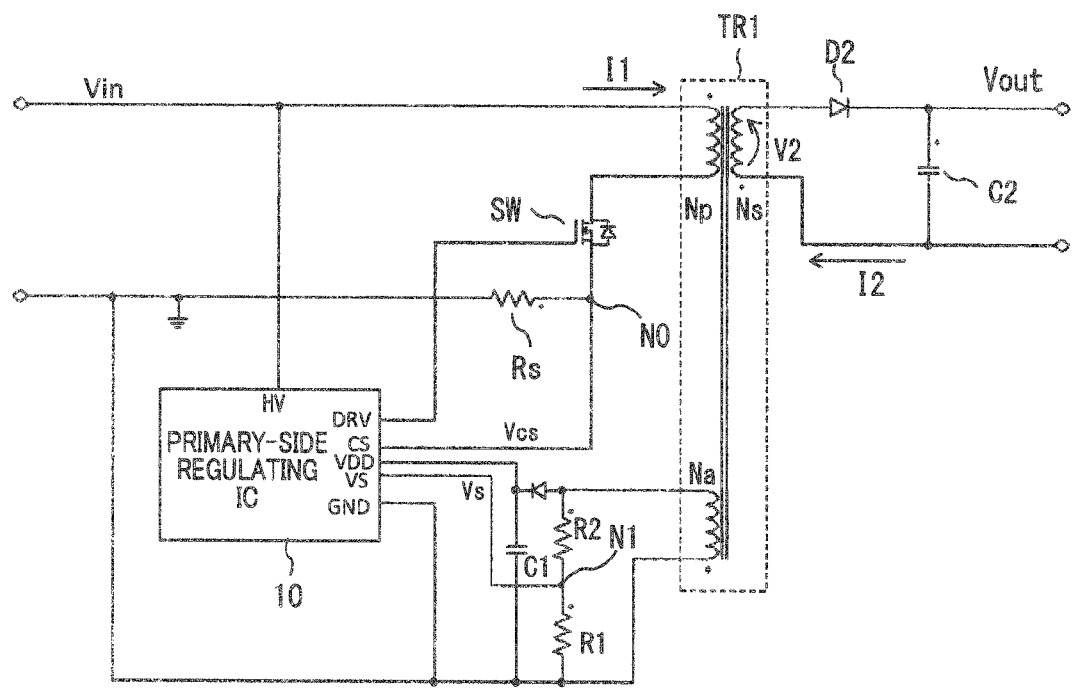
FIG. 1 is a circuit diagram of an insulated DC-DC converter serving as an insulated DC power supply according to an embodiment of the present invention.

FIG. 1 is a circuit diagram of an insulated DC-DC converter according to one embodiment of the invention which employs primary side regulation (PSR) to regulate the output voltage of the secondary side based on only the data at the primary side without feedback from the secondary side to the primary side.

The DC-DC converter of this embodiment includes a voltage transformer TR1 including a primary winding Np, a secondary winding Ns, and an auxiliary winding Na, a switching transistor SW (a switching device which is an N-channel MOSFET) connected in series with the primary winding Np of the transformer TR1, and a power supply controlling circuit 10 that drives the switching transistor SW. The power supply controlling circuit 10 in this embodiment is, but should not be limited to, a semiconductor integrated circuit (hereinafter referred to as "primary-side regulating IC") on a semiconductor chip composed of single-crystal silicon, for example.

In the DC-DC converter in FIG. 1, the primary-side regulating IC 10 is not provided with an oscillator to turn on or off the switching transistor SW but controls switching by self-excitation, and the secondary winding Ns and the primary winding Np in the transformer TR1 have opposite polarities such that the DC-DC converter operates as a quasi-resonant flyback converter to control the peak current of the switching device and thus the output voltage.

The DC-DC converter in FIG. 1 may be an AC-DC converter (AC adapter) including, on the primary side, a noise filter, a diode bridge circuit that rectifies AC voltage into DC voltage, and a smoothing capacitor that smooths the rectified voltage.

The DC-DC converter includes a rectifier diode D2 connected in series with the secondary winding Ns and a smoothing capacitor C2 between the cathode of the diode D2 and the other terminal of the secondary winding Ns, on the secondary side of the transformer TR1.

The DC-DC converter of this embodiment further includes a smoothing rectifier circuit including a rectifier diode D1 connected in series with the auxiliary winding Na and a smoothing capacitor C1 between the cathode of the diode D1 and the ground (GND), on the primary side. The rectified and smoothed voltage from the smoothing rectifier circuit is supplied to the power supply voltage terminal VDD of the primary-side regulating IC 10. At the same time, the input voltage Vin is supplied to the high voltage actuation terminal HV of the primary-side regulating IC 10 directly or via a diode or resistor to operate the primary-side regulating IC 10 before the voltage is induced in the auxiliary winding Na in response to the actuation of the power supply.

In this embodiment, a current-detecting resistor Rs is connected between the source of the switching transistor SW and the ground GND to convert the current flowing through the switching transistor SW into a voltage Vcs at a node N0 that is then supplied to the current detecting terminal CS of the primary-side regulating IC 10. At the same time, the voltage Vs of the contact node N1 of voltage-dividing resistors R1 and R2 is supplied to the voltage detecting terminal VS of the primary-side regulating IC 10. The resistors R1 and R2 in series, which divide the voltage induced in the auxiliary winding Na, are connected between the ground GND and the anode of the rectifier diode D1 connected in series with the auxiliary winding Na. Since the voltage Vs of the terminal VS is proportional to the output voltage Vout of the secondary side, the primary-side regulating IC 10 controls the current and switching frequency of the primary winding Np in accordance with the voltage Vs of the terminal VS to maintain the output voltage Vout at a predetermined level.

Figure 2:
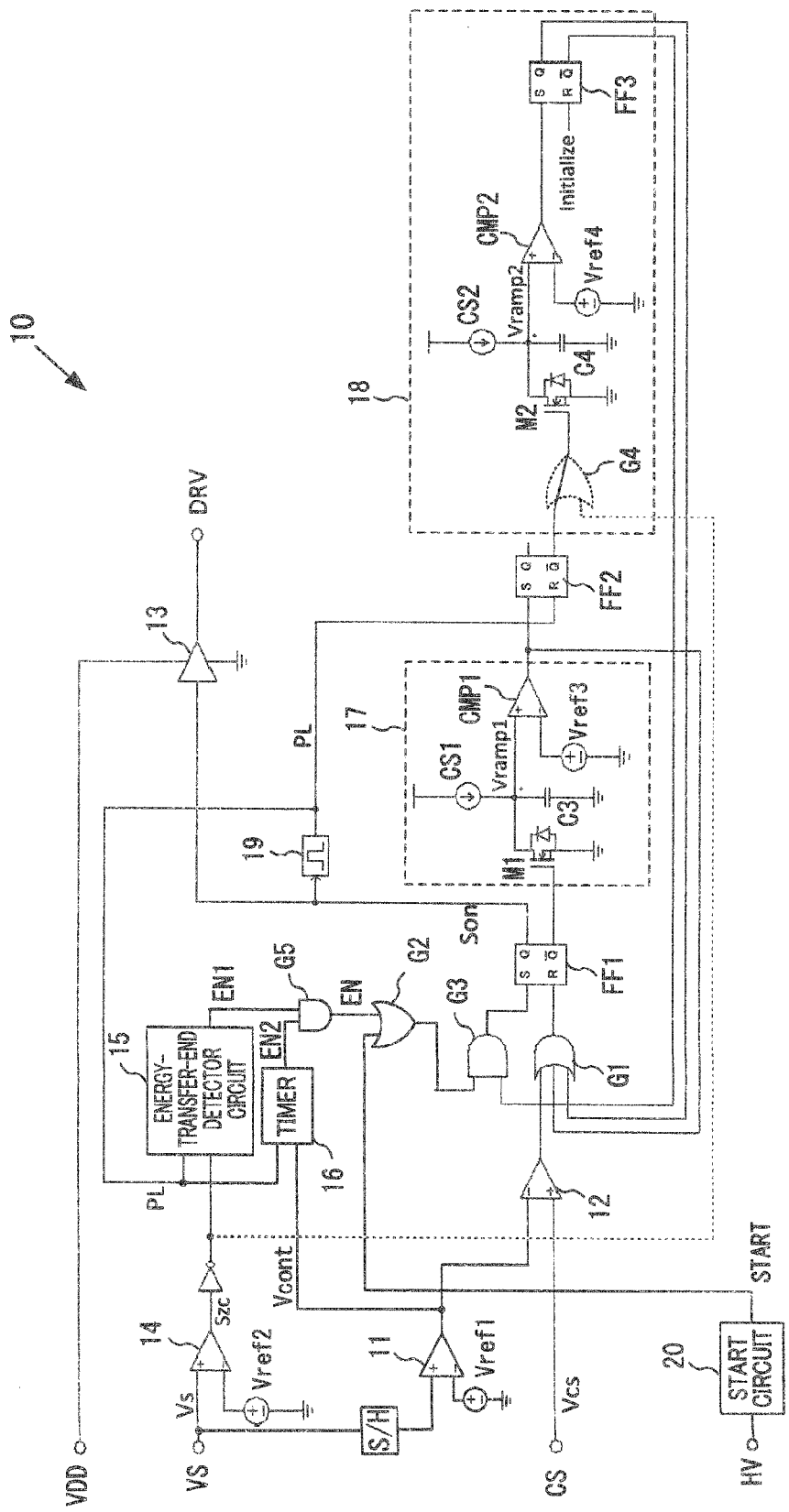
FIG. 2 is a circuit diagram illustrating an exemplary configuration of a primary-side regulating circuit (primary-side regulating IC) of a transformer in the insulated DC-DC converter of FIG. 1.

Referring to FIG. 2, the configuration of the primary-side regulating IC 10 will now be described in detail.

The primary-side regulating IC 10 of this embodiment determines the OFF timing of the switching transistor SW in accordance with the current detection voltage Vcs to control the peak current of the primary winding, and detects the time at which the current through the secondary side becomes 0 or the end of a period when energy is supplied to the secondary side (demagnetization period) in accordance with the voltage induced in the auxiliary winding Na in order to determine the ON timing of the switching transistor SW. The primary-side regulating IC 10 prevents the switching transistor SW from continuing the ON state for a predetermined period or more and detects the continuous demagnetization period of the secondary winding continuing for a predetermined period or more. The primary-side regulating IC 10 of this embodiment also prevents the switching transistor SW from turning on, upon detection of short circuit of the sensing resistor Rs.

To achieve the determination of the OFF timing of the switching transistor, as shown in FIG. 2, the primary-side regulating IC 10 of this embodiment includes a sample and hold circuit S/H that samples the voltage Vs (which is supplied to the terminal VS and proportional to the voltage induced in the auxiliary winding) at predetermined time intervals and holds it; an error amplifier 11 that generates a voltage dependent on a difference between the incoming voltage Vs and a predetermined reference voltage Vref1; and a comparator 12 that compares the current detection voltage Vcs received at the terminal CS with the output voltage Vcont of the error amplifier 11. The output of the comparator 12 is supplied to the reset terminal R of an RS flip-flop FF1 via an OR gate G1.

The output voltage Q of the flip-flop FF1 is then fed to the driver 13 which outputs a drive pulse DRV that turns on or off the switching transistor SW. In this embodiment, if the current detection voltage Vcs exceeds the output voltage Vcont of the error amplifier 11, the output of the comparator 12 goes HIGH, the RS flip-flop FF1 is reset, and then its output Q goes LOW, so that the drive pulse DRV from the driver 13 goes LOW, thereby turning off the switching transistor SW. The RS flip-flop FF1 can also be reset by time-up signals from a first timer circuit 17 and a second timer circuit 18, which will be described below.

To achieve the determination of the ON timing of the switching transistor, the primary-side regulating IC 10 includes a comparator 14 that compares the voltage Vs received at the terminal VS for detection of the voltage induced in the auxiliary winding with a predetermined reference voltage Vref2; and an energy-transfer-end detector circuit 15 that detects the end of the demagnetization period of the secondary winding with reference to the output voltage of the comparator 14. The output EN1 of the energy-transfer-end detector circuit 15 is supplied to the set terminal S of the RS flip-flop FF1 via an AND gate G5, an OR gate G2, and an AND gate G3. The reference voltage Vref2 is close to 0 V. If the current detection voltage Vs falls below the voltage Vref2, the output of the comparator 14 goes LOW, the RS flip-flop FF1 is thus set, and its output Q goes HIGH, so that the drive pulse DRV from the driver 13 goes HIGH, thereby turning on the switching transistor SW.

The primary-side regulating IC 10 further includes a timer circuit 16 that starts a timing operation when the switching transistor SW is turned on (i.e., when the drive pulse DRV from the driver 13 goes from LOW to HIGH) to determine the switching frequency. The timer circuit 16 measures the time dependent on the output voltage Vcont of the error amplifier 11. In particular, without any consideration of control of the peak current of the primary winding, a higher output voltage Vcont of the error amplifier 11 shortens the time measured by the timer circuit 16 and thus the switching frequency, whereas a lower output voltage Vcont of the error amplifier 11 extends the time measured by the timer circuit 16 and thus the switching frequency. This configuration can vary the switching frequency of the primary side in accordance with the voltage induced in the auxiliary winding. A combination of such control of the switching frequency and control of the peak current of the primary winding regulates the output voltage of the secondary side (maintains it at a predetermined level), so that the switching frequency may remain unchanged or decrease with an increasing voltage Vcont.

The output EN2 of the timer circuit 16 and the output EN1 of the energy-transfer-end detector circuit 15 are fed to the AND gate G5 which ANDs them and outputs a signal EN supplied to the set terminal of the flip-flop FF1 via the OR gate G2 and the AND gate G3. In other words, the flip-flop FF1 is set when the timer circuit 16 expires, the energy-transfer-end detector circuit 15 detects the end of the energy transfer, and its output EN1 goes HIGH.

The primary-side regulating IC 10 further includes a start circuit 20 that actuates the internal circuitry with a voltage received at the high voltage actuation terminal HV upon supply of power before the induction of voltage in the auxiliary winding Na and rising of the voltage VDD from the auxiliary power supply (D1, C1). A start-up signal START from the start circuit 20 is fed to the RS flip-flop FF1 via the OR gate G2 and the AND gate G3 such that the drive pulse DRV rises.

Hence, the energy-transfer-end detector circuit 15 and the timer circuit 16 function as an ON-timing generator circuit that determines ON-timings of the switching transistor SW.

The other input terminal of the AND gate G3 receives a time-up signal from a second timer circuit (described below) to detect short circuit of the sensing resistor Rs. Upon detection of short circuit of the sensing resistor Rs, the AND gate G3 is blocked to interrupt supply of an ON-timing giving signal to the RS flip-flop FF1, preventing the switching transistor SW from turning on.

The primary-side regulating IC 10 includes a start circuit 20 that actuates the internal circuitry with a voltage received at the high voltage actuation terminal HV upon supply of power before the voltage of the auxiliary power supply (D1, C1) rises. A start-up signal START from the start circuit 20 is fed to the first timer circuit 17 via the OR gate G2 for actuation.

To prevent the switching transistor SW from turning on upon detection of short circuit of the sensing resistor Rs, the primary-side regulating IC 10 of this embodiment includes a first timer circuit 17 to measure the maximum ON time of the switching transistor SW (primary side maximum ON time), and a second timer circuit 18 to measure the predetermined maximum demagnetization period (secondary side maximum ON time) of the transformer.

The first timer circuit 17 includes a constant-current source CS1, a capacitor C3 charged with a current from the constant-current source CS1, a MOS transistor M1 serving as a switch controlling discharging of the capacitor C3, and a comparator CMP1 comparing the voltage across the charged capacitor C3 with a predetermined reference voltage Vref3. The gate of the MOS transistor M1 receives the inverted output /Q of the flip-flop FF1. The capacitor C3 is discharged while /Q is HIGH and the switching transistor SW is therefore off. Charging of the capacitor C3 is started in response to turn on of the switching transistor SW and turn off of the MOS transistor M1. The output of the comparator CMP1 goes HIGH when the voltage across the charged capacitor C3 reaches the reference voltage Vref3.

In other words, the first timer circuit 17 measures the time period when the switching transistor SW is turned on, and sets a downstream flip-flop FF2 upon expiration of a predetermined time (primary side maximum ON time) T1max. The output of the comparator CMP1 is fed back to the reset terminal R of the upstream flip-flop FF1 via the OR gate G1 such that the flip-flop FF1 is reset and the switching transistor SW is forced to turn off upon expiration of the primary side maximum ON time T1max. The flip-flop FF2 is reset when the switching transistor SW is turned on in response to a pulse PL from a one-shot pulse generator circuit 19 that generates a pulse in synchronization with a rising edge of the output Q of the flip-flop FF1 (an ON signal for SW).

The second timer circuit 18 includes a constant-current source CS2, a capacitor C4 charged with a current from the constant-current source CS2, a MOS transistor M2 serving as a switch controlling discharging of the capacitor C4, a comparator CMP2 comparing the voltage across the charged capacitor C4 with a predetermined reference voltage Vref4, and an RS flip-flop FF3 receiving the output of the comparator CMP2 at the set terminal S. The output Q of the flip-flop FF3 is supplied to the OR gate G1.

The gate of the MOS transistor M2 is supplied with the inverted output /Q of the flip-flop FF2 which is set by the output of the first timer circuit 17. When the switching transistor SW is turned on, the flip-flop FF2 is reset and its inverted output /Q goes HIGH to turn on M2, so that the capacitor C4 is discharged. When the first timer circuit 17 expires, i.e., when the primary side maximum ON time expires, the MOS transistor M2 is turned off and charging of the capacitor C4 is started. When the voltage across the charged capacitor C4 reaches the reference voltage Vref4, the output of the comparator CMP2 goes HIGH to set the downstream flip-flop FF3.

In other words, the second timer circuit 18 measures the demagnetization time of the transformer and sets the flip-flop FF3 when the measured demagnetization time reaches the maximum demagnetization period T2max dependent on the predetermined Vref4. Upon set of the flip-flop FF3, its inverted output /Q goes LOW to block the AND gate G3 such that any signal giving ON-timings to the switching transistor SW is not supplied from the energy-transfer-end detector circuit 15 or the timer circuit 16 to the RS flip-flop FF1, preventing the switching transistor SW from turning on.

The flip-flop FF3 receives an initializing signal (reset signal) at the reset terminal and remains unchanged from when /Q goes LOW until initialization of the IC, preventing the switching transistor SW from turning on.

A reason will now be described for use of the first timer circuit 17 and the second timer circuit 18 that measures the predetermined maximum demagnetization period (secondary side maximum ON time) of the transformer.

In case of short circuit of the sensing resistor Rs, the voltage Vcs of the terminal CS remains LOW, which hangs the comparator 12. Thus, the output of the comparator 12 cannot reset the flip-flop FF1, precluding turn-off of the switching transistor SW.

The peak current of the primary winding in the transformer I1p at this time is expressed by the following expression:

$$I1p = (Vin/L1) \cdot T1\max \quad (1)$$

where Vin is the input voltage of the primary winding, L1 is the inductance of the primary winding, and T1max is the primary side maximum ON time. Expression (1) shows that although the peak current I1p of the primary winding depends on the input voltage, the primary side maximum ON time T1max can suppress the primary side peak current I1p. In view of this, the primary-side regulating IC 10 of this embodiment is designed to reset the flip-flop FF1 to turn off the switching transistor SW upon expiration of the first timer circuit 17, i.e., the primary side maximum ON time T1max.

The demagnetization time of the transformer Tdem is expressed by the following expression:

$$T\text{dem} = (L2 \cdot I2p)/(V\text{out} + VF) \quad (2)$$

where L2 is the inductance of the secondary winding, Vout is the output voltage of the secondary side, and VF is the forward voltage of the rectifier diode D2 on the secondary side. Since the peak current of the secondary side I2p is proportional to the peak current of the primary side I1p, the above expression can be transformed into the following expression:

$$T\text{dem}=T1\max\cdot(N2/N1)\cdot\{V\text{in}/(V\text{out}+VF)\} \quad (3)$$

where N1 is the turns of the primary winding and N2 is the turns of the secondary winding. Expression (3) shows that the demagnetization period of the transformer Tdem is proportional to Vin and T1max with fixed Vout and VF.

For this reason, the primary-side regulating IC 10 of this embodiment sets the maximum demagnetization period T2max. When the first timer circuit 17 measuring the primary side maximum ON time T1max expires and the switching transistor SW is therefore turned off, the second timer circuit 18 starts a timing operation and then resets the flip-flop FF3 in response to Tdem exceeding T2max. The output /Q of the flip-flop FF3 then blocks the AND gate G3 such that the ON-state starting signal EN is not fed to the flip-flop FF1. This configuration prevents the switching transistor SW from turning on and current from continuously flowing through the primary winding in case of short circuit of the sensing resistor.

In the embodiment of FIG. 2, the inverted output /Q of the flip-flop FF2 is directly supplied to the gate of the MOS transistor M2. Alternatively, an OR gate G4 (indicated by a dotted line), which receives the output signal of the comparator 14 at the other input, may be disposed between the inverted output terminal of the flip-flop FF2 and the gate of the MOS transistor M2. Hence, if the output of the comparator 14 is LOW (the voltage Vs of the VS terminal is 0 V), the MOS transistor M2 is turned off when the inverted output /Q of the flip-flop FF2 goes LOW, which starts charging of the capacitor C4 and thus the timing operation in the second timer circuit 18. In this case, the comparator 14 serves as a section for detecting a demagnetization period, and the second timer circuit 18 executes a timing operation during the demagnetization period.

Figure 3:
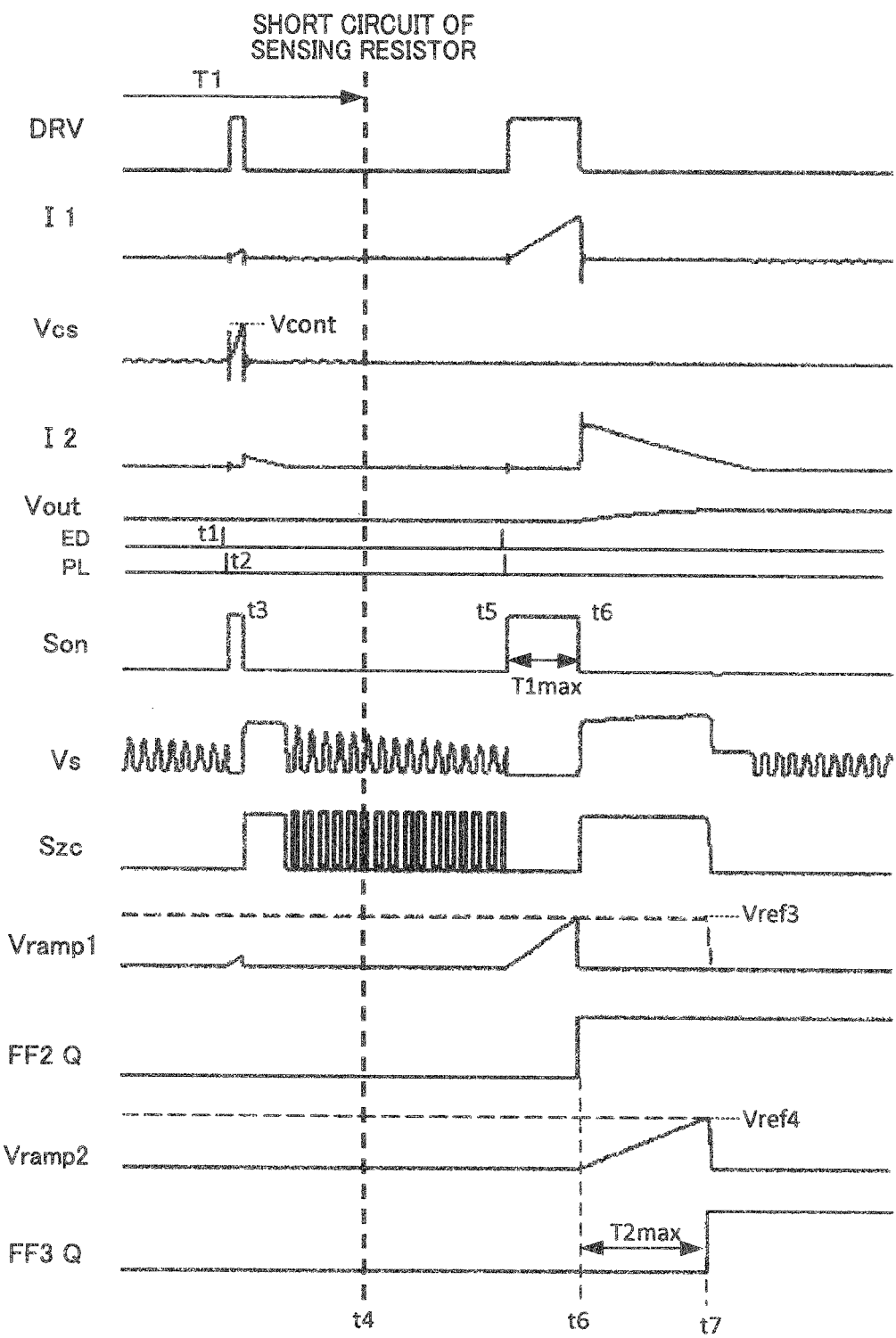
FIG. 3 is a waveform chart showing variations in the potentials of the components of the primary-side regulating IC during a normal operation of the primary-side regulating IC and after short circuit of a current-detecting resistor or short circuit between a current-detecting terminal and the ground in the embodiment.

Now will be explained the operation of the primary-side regulating IC 10 of this embodiment in case of short circuit of the sensing resistor Rs, with reference to the timing chart of FIG. 3.

In the primary-side regulating IC 10 of this embodiment during a normal period (T1 in FIG. 3) in which no short circuit occurs in the sensing resistor Rs, the output signal EN1 of the energy-transfer-end detector circuit 15 goes HIGH when the voltage Vs of the terminal VS falls below the reference voltage Vref2. Further, the timer circuit 16 is reset by the pulse signal PL to start a timing operation and its output signal EN2 goes HIGH upon lapse of a period dependent on the output voltage Vcont of the error amplifier 11.

When both the signal EN1 and the signal EN2 are HIGH, the output signal EN of the AND gate G5 goes HIGH, so that the flip-flop FF1 is set and the drive signal DRV goes HIGH, turning on the switching transistor SW (timing t1). The one-shot pulse generator circuit 19 then detects a rising edge of the drive signal DRV and generates a pulse PL (timing t2). The pulse is fed to the flip-flop FF2 upstream of the second timer circuit 18 and the inverted output /Q changes to HIGH, turning on the MOS transistor M2 to discharge the capacitor C4.

When the switching transistor SW is turned on, the first timer circuit 17 starts a timing operation. Upon lapse of the primary side maximum ON time T1max, the output of the comparator 12 changes to HIGH and the flip-flop FF1 is therefore reset, so that the drive signal DRV changes to LOW, turning off the switching transistor SW (timing t3). The energy in the transformer is then transferred to the secondary side. Afterwards, if the current I2 through the secondary winding decreases to close to zero, resonance is produced to cause fluctuations (ringing) in the voltage Vs of the terminal VS.

If the sensing resistor Rs is short-circuited at this time, the current detection voltage Vcs fails to increase and the output of the comparator 12 fails to change to HIGH, which precludes a normal turn-off operation. The flip-flop FF1 is reset upon lapse of the primary side maximum ON time (timing t6) measured by the first timer circuit 17, so that the drive signal DRV changes to LOW and the switching transistor SW is turned off. Such a phenomenon extends the ON time of SW and increases the peak of the current I1 flowing through the primary winding, which results in an increase in the current I2 flowing through the secondary winding during a demagnetization period and extends the demagnetization period.

Upon lapse of the primary side maximum ON time measured by the first timer circuit 17, the flip-flop FF2 is set to cause the second timer circuit 18 to start measuring the maximum demagnetization period, while a high peak of the current I1 through the primary winding makes the voltage Vs of the terminal VS fall slowly. Accordingly, upon lapse of the maximum demagnetization period (timing t7), the second timer circuit 18 expires, the flip-flop FF3 is set, and its output Q changes to reset the flip-flop FF1, turning off the switching transistor SW. The output /Q of the set flip-flop FF3 prevents the ON-state starting signal EN from passing through the AND gate G3, allowing the switching transistor SW to remain in the OFF state and avoiding continuous flow of current through the primary side.

This configuration prevents damage to the switching device, transformer, and diodes and other components in case of short circuit of the sensing resistor Rs.

(Modification)

A modification of the primary-side regulating IC 10 of the above embodiment will now be described with reference to FIG. 4. This modification of the primary-side regulating IC 10 is applied to the DC-DC converter in FIG. 1.

As Expression (1) shows, the peak current I1p of the primary winding is proportional to the input voltage Vin of the primary winding. The modification of the primary-side regulating IC in FIG. 4 includes a variable current source CS1 in the first timer circuit 17, and a Vin level detector circuit 21 that detects the potential of the terminal I-IV for reception of the input voltage Vin and outputs a voltage proportional to Vin. The output voltage of the Vin level detector circuit 21 varies the value of the current from the variable current source CS1. In particular, a higher input voltage Vin increases the current from the variable current source CS1 and shortens the time set on the first timer circuit 17, while a lower input voltage Vin decrease the current from the variable current source CS1 and extends the time set on the first timer circuit 17.

This produces a variable primary side maximum ON time T1max that is inversely proportional to the input voltage Vin, and cancels the dependence of the peak currents in the primary side and secondary side of the transformer on the input voltage in case of short circuit of the sensing resistor.

For instance, with an increased input voltage Vin, the peak currents in the primary side and secondary side of the transformer rise in case of short circuit of the sensing resistor. If a fixed time is set on the first timer circuit 17, more power loss occurs in the transformer, resulting in heavier load on the transformer, switching transistor SW, and diode D2 and other devices and a higher risk of damage to these components than with lower peak currents.

In contrast, in the case of an increase in Vin in this modification, the time set on the first timer circuit 17 is shortened and increases in the peak currents in the primary side and secondary side can be suppressed, suppressing power loss and the risk of damage to the devices. One of the existing terminals of the primary-side regulating IC 10 may serve as the terminal HV so that IC can operate immediately after supply of power while no voltage is induced in the auxiliary winding. Thus, the number of terminals does not increase.

Figure 4:
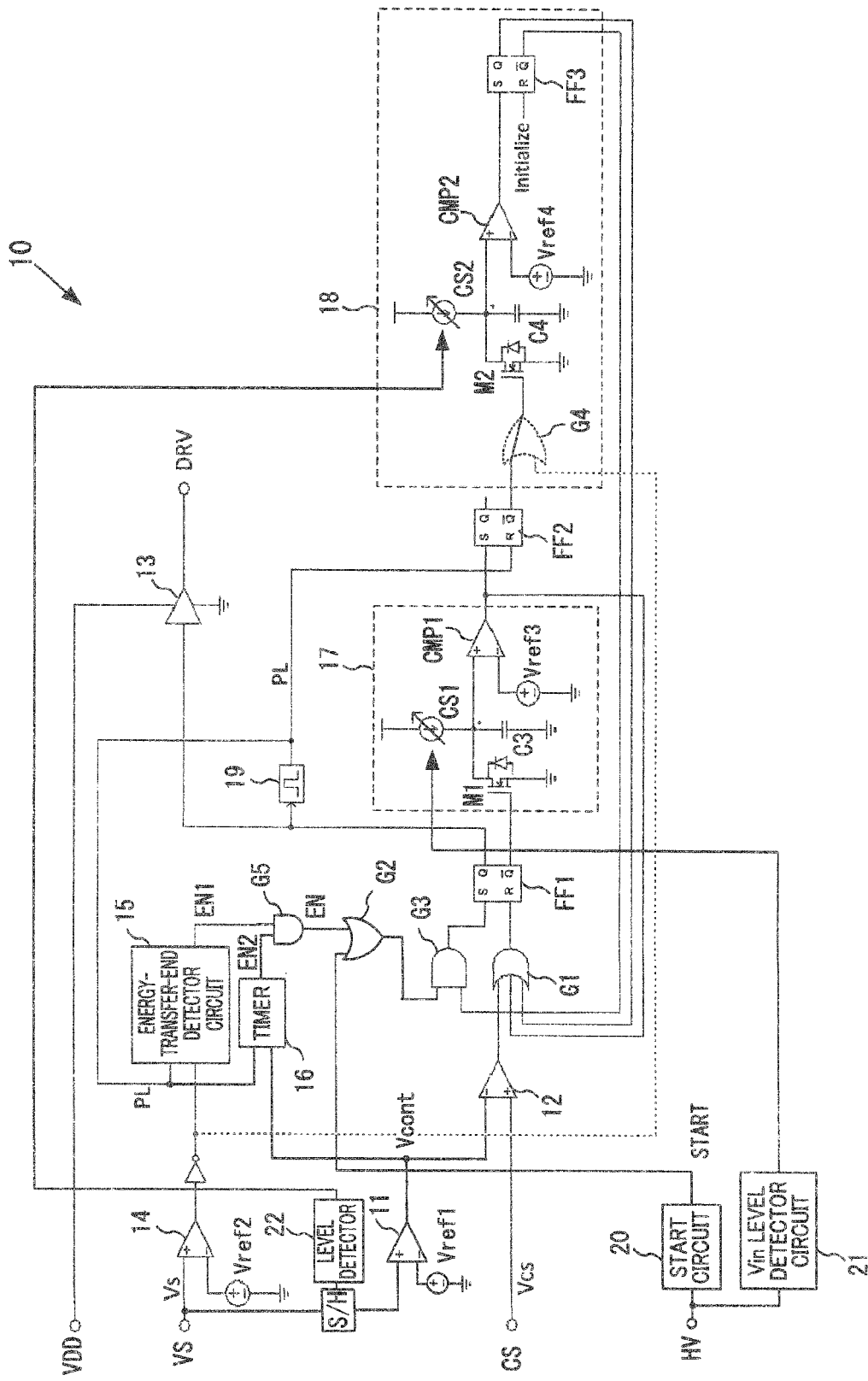
FIG. 4 is a circuit diagram of the primary-side regulating IC according to another embodiment.

The modification of the primary-side regulating IC in FIG. 4 includes a variable current source as the current source CS2 of the second timer circuit 18, and a Vs level detector circuit 22 that outputs a voltage proportional to the voltage sampled by the sample and hold circuit (S/H) connected to the terminal VS receiving the voltage Vs resulting from division of the voltage induced in the auxiliary winding. The output voltage of the Vs level detector circuit 22 varies the current from the variable current source CS2. In particular, with an increased voltage Vs, the current from the variable current source CS2 increases, which shortens the time set on the second timer circuit 18. With a decreased voltage Vs, the current from the variable current source CS2 decreases, which extends the time set on the second timer circuit 18.

For the flyback converter in FIG. 1, it is known that the demagnetization period of the transformer is proportional to the peak current of the primary side and inversely proportional to Vout+VF, which is the sum of the output voltage and the forward voltage of the diode D2. With a fixed maximum demagnetization period T2max, the peak currents of the primary side and the secondary side during a halt of switching are proportional to Vout+VF. For this reason, a higher output voltage leads to a higher risk of damage to the switching device, transformer, and diodes and other components. Such dependence of the peak current on the output voltage is not preferred for a constant-current supplying converter intended for charging batteries and use in LED lights. To solve such a problem, the maximum demagnetization time T2max of the transformer is made variable and inversely proportional to the voltage Vs as explained above to cancel the dependence of the peak current in the transformer on the output voltage during a halt of switching.

An insulated converter with a transformer normally has a complicated circuit design if it includes a configuration to transfer the voltage Vout+VF to the primary side. To avoid this, the auxiliary winding is provided which has a voltage proportional to the voltage Vout+VF of the secondary side. In particular, the potential of the terminal VS is expressed by the following expression:

$$VS = \frac{R_2}{R_1 + R_2} \cdot \frac{N_a}{N_2} \cdot V_2 = \frac{R_2}{R_1 + R_2} \cdot \frac{N_a}{N_2} \cdot (V_{out} + V_F) \quad (4)$$

where Na/N2 is the ratio of the number of turns in the auxiliary winding to that in the secondary winding and VF is the forward voltage of the diode D2 on the secondary side. As Expression (4) shows, the potential of the terminal VS is proportional to the voltage between the terminals of the secondary winding (=Vout+VF). For this reason, the converter of one embodiment of the present invention receives the voltage Vs of the terminal VS and sets a variable time on the second timer circuit 18 to cancel the dependence of the peak currents on the output voltage, thereby preventing damage to the loads as described above.

The present invention should not be limited to the embodiment and modification which have been described so far. For example, the modification of FIG. 4 includes the primary-side regulating IC 10 including a configuration in which the time set on the first timer circuit 17 can be varied by the output voltage of the Vin level detector circuit 21 and a configuration in which the time set on the second timer circuit 18 can be varied by the output voltage of the Vs level detector circuit 22, but may alternatively include only one of these configurations.

For another example, the voltage detector circuit (comparator 14) in the above embodiment detects ON timings for the switching device with reference to the voltage induced in the auxiliary winding of the transformer or the voltage proportional to it, but may alternatively detect ON timings for the switching device with reference to the voltage across the primary winding. Such detection based on the voltage across the primary winding differs from the detection based on the voltage induced in the auxiliary winding of the transformer or the voltage proportional to it, in that it involves the opposite polarity and the center of the LC resonance voltage range after demagnetization is not the ground voltage but the input voltage Vin.

For another example, the DC-DC converter in FIG. 1 includes the secondary side circuitry with the simplest configuration composed of the rectifier diode D2 and the smoothing capacitor C2. Alternatively, the present invention can be applied to a synchronous rectification DC-DC converter that includes a MOS transistor instead of the rectifier diode D2, and a control circuit monitoring the source and drain voltages of the transistor for generation of ON/OFF control signals, in which the rectifier MOS transistor conducts when current flows through the rectifier diode.

For another example, the PSR DC-DC converter in the above embodiment regulates the output voltage of the secondary side only with reference to data from the primary side and without a feedback voltage from the secondary side. Alternatively, the present invention can be applied to a DC-DC converter shown in FIG. 5 that includes a detector circuit 31 for detection of the output voltage or current on the secondary side, and a photocoupler (a light-emitting diode 32a and a phototransistor 32b) transmitting the detected data to the primary-side regulating IC 10.

Figure 5:
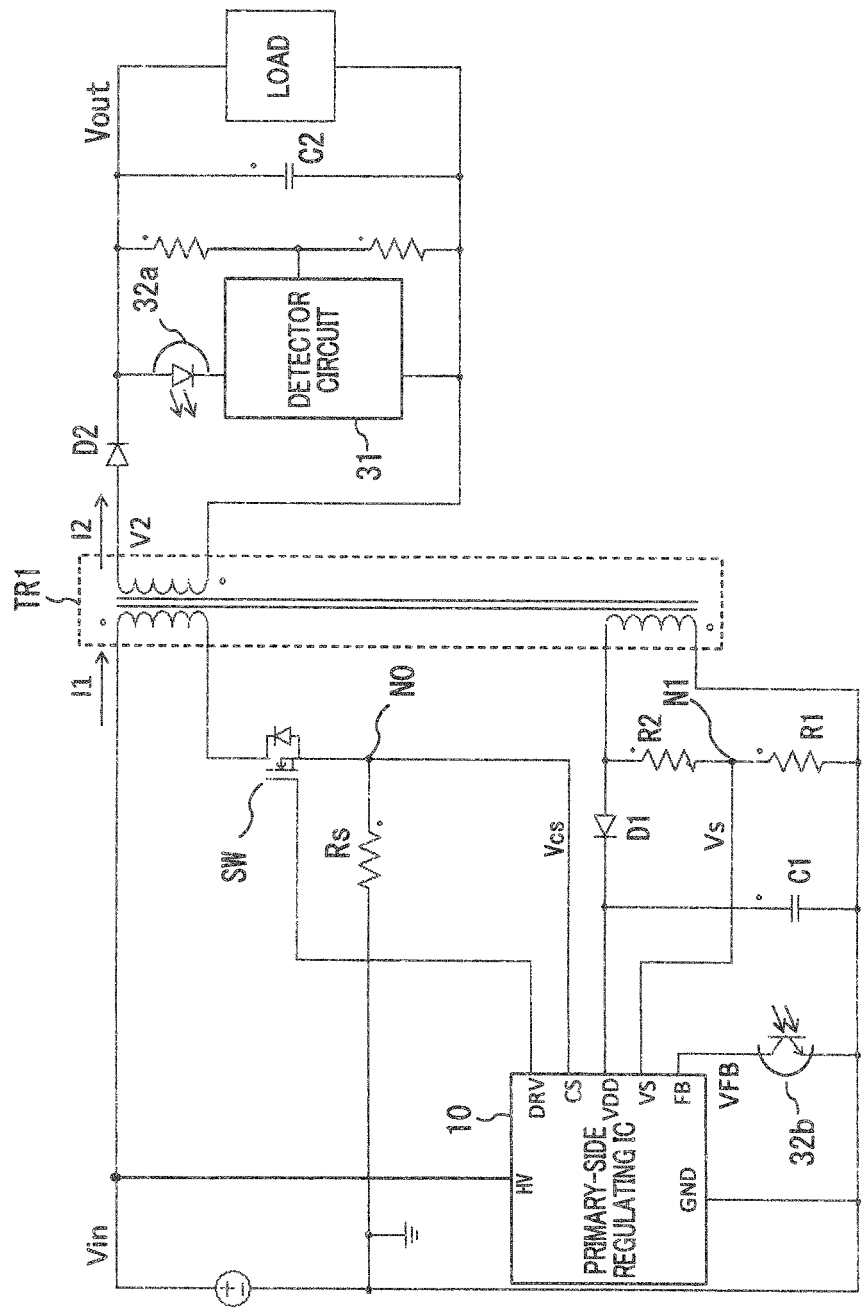
FIG. 5 is a circuit diagram of the insulated DC-DC converter according to another embodiment.

To implement the DC-DC converter in FIG. 5, the primary-side regulating IC 10 requires a terminal FB for connection to the phototransistor 32b receiving feedback data from the secondary side. To achieve the functions of the primary-side regulating IC 10 explained above, the DC-DC converter should preferably include, in addition to the circuitry in FIG. 2 or 4 and the terminal FE, a Vcont generator circuit 24 shown in FIG. 6 that includes a constant-current source CS3 supplying a bias current to the phototransistor 32b connected to the terminal FB, and an error amplifier generating a reference voltage Vcont for the comparator 12 and the timer circuit 16 with reference to the potential of the terminal FB.

The entire disclosure of Japanese Patent Application No. 2014-252823 filed on Dec. 15, 2014 including description, claims, drawings, and abstract is incorporated herein by reference in its entirety.

What is claimed is:

1. An insulated DC power supply comprising:
a voltage transformer comprising a primary winding, a secondary winding, and an auxiliary winding;
a switching device causing current to flow intermittently through the primary winding of the transformer; and
a primary-side regulating circuit receiving a voltage proportional to a current flowing through the primary winding of the transformer, and a voltage proportional to a voltage induced in the auxiliary winding of the transformer to generate and output a drive pulse for turning on or off the switching device, the primary-side regulating circuit comprising:
a voltage detector circuit giving ON-timings for the switching device with reference to a voltage across the primary winding of the transformer, the voltage induced in the auxiliary winding, or the voltage proportional to the voltage induced in the auxiliary winding;
a current detector circuit giving OFF-timings for the switching device with reference to the voltage proportional to the current flowing through the primary winding of the transformer;
an ON/OFF signal generator circuit generating signals for turning on or off the switching device with reference to signals from the current detector circuit and the voltage detector circuit;
a first timer circuit starting up in synchronization with the ON timing of the switching device, starting to measure the ON time of the switching device, and then expiring upon lapse of a predetermined primary side maximum ON time; and
a second timer circuit starting up upon expiration of the first timer circuit, starting time measurement, and then expiring upon lapse of a predetermined maximum demagnetization time, wherein
the switching device is turned off upon expiration of the first timer circuit, and the ON/OFF signal generator circuit does not generate a signal for turn-on of the switching device when the second timer circuit expires.

2. The insulated DC power supply of claim 1, further comprising a demagnetization period detector detecting a demagnetization period of the transformer, wherein the second timer circuit executes time measurement only during the demagnetization period detected by the demagnetization period detector.

3. The insulated DC power supply of claim 1, wherein the current detector circuit receives a voltage resulting from current-to-voltage conversion in a resistor connected in series with the switching device.

4. The insulated DC power supply of claim 1, wherein the voltage detector circuit receives a voltage from a voltage divider that divides the voltage induced in the auxiliary winding of the transformer.

5. The insulated DC power supply of claim 4, further comprising an input-voltage-level detector circuit detecting the potential of the input voltage of the primary winding of the transformer, wherein the first timer circuit measures a time inversely proportional to the input voltage.

6. The insulated DC power supply of claim 4, further comprising an induced-voltage-level detector circuit detecting the potential of the voltage from the voltage divider, wherein the second timer circuit measures a time inversely proportional to the induced voltage.

7. The insulated DC power supply of claim 4, wherein the current detector circuit is a voltage comparator circuit that compares the voltage resulting from current-to-voltage conversion in the resistor connected in series with the switching device with the voltage proportional to the voltage from the voltage divider, and outputs a signal indicating OFF-timings for the switching device.

8. A method of controlling an insulated DC power supply comprising:
a voltage transformer comprising a primary winding, a secondary winding, and an auxiliary winding;
a switching device causing current to flow intermittently through the primary winding of the transformer; and
a primary-side regulating circuit receiving a voltage proportional to a current flowing through the primary winding of the transformer, and a voltage proportional to a voltage induced in the auxiliary winding of the transformer to generate and output a drive pulse for turning on or off the switching device, the method comprising:
monitoring the voltage induced in the auxiliary winding of the transformer or the voltage proportional to the voltage induced in the auxiliary winding, and the voltage proportional to the current flowing through the primary winding of the transformer,
starting a first time-measurement in synchronization with each ON-timing of the switching device,
starting the next ON operation of the switching device when the current detector circuit detects that the current flowing through the primary winding of the transformer reaches a predetermined current value before expiration of a predetermined primary side maximum ON time,
turning off the switching device and starting a second time-measurement upon expiration of the primary side maximum ON time before the current detector circuit detects that the current flowing through the primary winding of the transformer reaches the predetermined current value, and
preventing generation of an ON signal for the switching device after expiration of a predetermined maximum demagnetization time.

* * * * *